(12) United States Patent
Brown et al.

(10) Patent No.: US 11,136,452 B2
(45) Date of Patent: Oct. 5, 2021

(54) POLY(METHYL METHACRYLATE) RESIN COMPOSITION

(71) Applicant: Rohm and Haas Company, Collegeville, PA (US)

(72) Inventors: Steven Brown, Elverson, PA (US); Carlos A. Cruz, Collegeville, PA (US); Morris Wills, Philadelphia, PA (US)

(73) Assignee: Rohm and Haas Company, Collegeville, PA (US)

( * ) Notice: Subject to any disclaimer, the term of this patent is extended or adjusted under 35 U.S.C. 154(b) by 82 days.

(21) Appl. No.: 16/631,409

(22) PCT Filed: Jul. 13, 2018

(86) PCT No.: PCT/US2018/041953
§ 371 (c)(1),
(2) Date: Jan. 15, 2020

(87) PCT Pub. No.: WO2019/018219
PCT Pub. Date: Jan. 24, 2019

(65) Prior Publication Data
US 2020/0216656 A1  Jul. 9, 2020

Related U.S. Application Data

(60) Provisional application No. 62/535,519, filed on Jul. 21, 2017.

(51) Int. Cl.
*C08L 33/12* (2006.01)
*C08F 285/00* (2006.01)
*C08L 51/04* (2006.01)

(52) U.S. Cl.
CPC ............ *C08L 33/12* (2013.01); *C08F 285/00* (2013.01); *C08L 51/04* (2013.01); *C08L 2205/02* (2013.01); *C08L 2207/53* (2013.01)

(58) Field of Classification Search
CPC .... C08L 285/00; C08F 2/38; C08F 220/1804; C08L 2207/53; C08L 33/12; C08L 51/04
See application file for complete search history.

(56) References Cited

U.S. PATENT DOCUMENTS

| 6,218,447 | B1 | 4/2001 | Sugaya et al. |
| 6,319,966 | B1 | 11/2001 | Kang et al. |
| 6,555,245 | B2 | 4/2003 | Tajima et al. |
| 7,189,852 | B2 | 3/2007 | Palmer et al. |
| 7,722,946 | B2 | 5/2010 | Wada et al. |
| 2016/0340505 | A1 | 11/2016 | Kim et al. |
| 2018/0066117 | A1 | 3/2018 | Banaszak et al. |

FOREIGN PATENT DOCUMENTS

| EP | 0263633 A2 | 4/1988 |
| EP | 1350812 A2 | 10/2003 |

*Primary Examiner* — Jeffrey C Mullis
(74) *Attorney, Agent, or Firm* — Brian L. Mutschler

(57) ABSTRACT

Provided are poly(methyl methacrylate) resin compositions containing (a) a methyl methacrylate polymer, and (b) a multistage acrylic impact modifier containing (i) a core-shell polymer, and (ii) an overpolymer containing methyl methacrylate monomers and a chain transfer agent.

10 Claims, No Drawings

POLY(METHYL METHACRYLATE) RESIN COMPOSITION

FIELD OF THE INVENTION

This invention relates generally to poly(methyl methacrylate) resin compositions containing a methyl methacrylate polymer and a multistage acrylic impact modifier including a core-shell polymer and an overpolymer.

BACKGROUND

Poly(methyl methacrylate) ("PMMA") is a highly appreciated plastic with excellent weatherability, stiffness, scratch and UV resistance, and flow properties. It can be fabricated in many tints and hues of color, either as a transparent or opaque material, thus adding flexibility and breadth to its potential applications. As a result of those properties, PMMA is applied in many areas, from capstock materials for siding and profiles, to signage and automotive parts. In spite of such attractive traits, PMMA is a brittle material that requires the use of rubbery impact modifiers at high loadings, e.g., as high as 40 or 50 weight % of the matrix. Even with such loading levels, only modest impact increases are seen in PMMA, in comparison with other materials. The presence of impact modifier also drastically reduces the gloss and melt flow of the system (which severely affects its processability).

Various impact modifiers have been utilized in the industry for use in PMMA resin compositions. For example, US 2016/0340505 discloses high-gloss poly(methyl methacrylate)-acrylic copolymer compositions containing an acrylic copolymer, a modifier for scratch resistance, and a poly (methyl methacrylate) resin. The prior art does not, however, disclose a PMMA resin composition according to the present invention, which provides high impact performance while maintaining a high level of gloss and flow.

Accordingly, there is a need to develop PMMA resin compositions containing acrylic impact modifiers that provide improvements in impact strength while maintaining desirable gloss and melt flow characteristics.

STATEMENT OF INVENTION

One aspect of the invention provides a poly(methyl methacrylate) resin composition comprising (a) 30 to 90 weight % of a methyl methacrylate polymer, based on the total weight of the poly(methyl methacrylate) resin, comprising polymerized structural units of (i) 50 to 100 weight % methyl methacrylate monomer, based on the total weight of the methyl methacrylate polymer, and (ii) 0 to 50 weight % of a copolymerizable monomer, based on the total weight of the methyl methacrylate polymer, (b) 10 to 70 weight % of a multistage acrylic impact modifier, based on the total weight of the poly(methyl methacrylate) resin, comprising (i) 50 to 99 weight % of a core-shell polymer, based on the total weight of the multistage acrylic impact modifier, comprising (A) 50 to 99.9 weight % of a core polymer, based on the total weight of the core-shell polymer, comprising polymerized structural units of (1) 98.2 to 99.8 weight % of $C_1$-$C_{12}$ alkyl acrylate monomers, and (2) 0.2 to 1.8 weight % of a cross-linker, based on the total weight of the core polymer, and (B) 0.1 to 50 weight % of a shell polymer, based on the total weight of the core-shell polymer, comprising polymerized structural units of (1) 50 to 100 weight % methyl methacrylate monomers, and (2) 0 to 50 weight % of a copolymerizable monomer, based on the total weight of the shell polymer, and (ii) 1 to 50 weight % of an overpolymer, based on the total weight of the multistage acrylic impact modifier, comprising polymerized structural units of (A) 50 to 99.95 weight % methyl methacrylate monomers, based on the total weight of the overpolymer, (B) 0.05 to 2 weight % of a chain transfer agent, based on the total weight of the overpolymer, and (C) 0 to 49.95 weight % of a copolymerizable monomer.

Another aspect of the present invention provides an article of manufacture comprising a poly(methyl methacrylate) resin composition comprising (a) 30 to 90 weight % of a methyl methacrylate polymer, based on the total weight of the poly(methyl methacrylate) resin, comprising polymerized structural units of (i) 50 to 100 weight % methyl methacrylate monomers, based on the total weight of the methyl methacrylate polymer, and (ii) 0 to 50 weight % of a copolymerizable monomer, based on the total weight of the methyl methacrylate polymer, (b) 10 to 70 weight % of a multistage acrylic impact modifier, based on the total weight of the poly(methyl methacrylate) resin, comprising (i) 50 to 99 weight % of a core-shell polymer, based on the total weight of the multistage acrylic impact modifier, comprising (A) 50 to 99.9 weight % of a core polymer, based on the total weight of the core-shell polymer, comprising polymerized structural units of (1) 98.2 to 99.8 weight % of $C_1$-$C_{12}$ alkyl acrylate monomers, and (2) 0.2 to 1.8 weight % of a cross-linker, based on the total weight of the core polymer, and (B) 0.1 to 50 weight % of a shell polymer, based on the total weight of the core-shell polymer, comprising polymerized structural units of (1) 50 to 100 weight % methyl methacrylate monomers, and (2) 0 to 50 weight % of a copolymerizable monomer, based on the total weight of the shell polymer, and (ii) 1 to 50 weight % of an overpolymer, based on the total weight of the multistage acrylic impact modifier, comprising polymerized structural units of (A) 50 to 99.95 weight % methyl methacrylate monomers, based on the total weight of the overpolymer, (B) 0.05 to 2 weight % of a chain transfer agent, based on the total weight of the overpolymer, and (C) 0 to 49.95 weight % of a copolymerizable monomer.

In another aspect, the present invention provides a poly (methyl methacrylate) resin composition comprising (a) 50 to 70 weight % of a methyl methacrylate polymer, based on the total weight of the poly(methyl methacrylate) resin, comprising polymerized structural units of (i) 90 to 99 weight % methyl methacrylate monomers, based on the total weight of the methyl methacrylate polymer, and (ii) 1 to 10 weight % of a copolymerizable monomer, based on the total weight of the methyl methacrylate polymer, (b) 30 to 50 weight % of a multistage acrylic impact modifier, based on the total weight of the poly(methyl methacrylate) resin, comprising (i) 65 to 95 weight % of a core-shell polymer, based on the total weight of the multistage acrylic impact modifier, comprising (A) 90 to 98 weight % of a core polymer, based on the total weight of the core-shell polymer, comprising polymerized structural units of (1) 99 to 99.6 weight % of $C_1$-$C_{12}$ alkyl acrylate monomers selected from the group consisting of butyl acrylate, 2-ethylhexyl acrylate, and combinations thereof, and (2) 0.4 to 1.0 weight % of allyl methacrylate, based on the total weight of the core polymer, and (B) 2 to 10 weight % of a shell polymer, based on the total weight of the core-shell polymer, comprising polymerized structural units of (1) 95 to 100 weight % methyl methacrylate monomers, and (2) 0 to 5 weight % of a copolymerizable monomer, based on the total weight of the shell polymer, and (ii) 5 to 35 weight % of an overpolymer, based on the total weight of the multistage acrylic impact modifier, comprising polymerized structural units of (A) 84.5 to 97.5 weight % methyl methacrylate monomers, based on the total weight of the overpolymer, (B) 0.5 to 1.5 weight % of a chain transfer agent selected from the group consisting of butyl 3-mercaptopropionate, dodecyl mercaptan, and combinations thereof, based on the total weight of the overpolymer, and (C) 1 to 15 weight % butyl acrylate monomer, based on the total weight of the overpolymer.

DETAILED DESCRIPTION

The inventors have now surprisingly found that poly (methyl methacrylate) ("PMMA") resin compositions containing methyl methacrylate polymer and a multistage acrylic impact modifier containing a core-shell polymer and an overpolymer provide significant improvement in impact strength, while maintaining gloss and melt flow characteristics.

As used herein, the term "polymer" refers to a polymeric compound prepared by polymerizing monomers, whether of the same or a different type. The generic term "polymer" includes the terms "homopolymer," "copolymer," "terpolymer," and "resin." As used herein, the term "polymerized structural units" of a given monomer refers to the remnant of the monomer after polymerization. As used herein, the term "(meth)acrylate" refers to either acrylate or methacrylate or combinations thereof, and the term "(meth)acrylic" refers to either acrylic or methacrylic or combinations thereof. As used herein, the term "substituted" refers to having at least one attached chemical group, for example, alkyl group, alkenyl group, vinyl group, hydroxyl group, carboxylic acid group, other functional groups, and combinations thereof.

As used herein, the term "overpolymer" refers to an outermost polymer of a multistage acrylic impact modifier, of which less than 20 weight % of the overpolymer is grafted onto an underlying core-shell polymer of the impact modifier. The amount of overpolymer grafted onto a core-shell polymer can be determined by, for example, a comparison of soluble material extracted from the core, core-shell, and core-shell-overpolymer particles. Such methods include, for example, extraction of the soluble portion of each with a suitable solvent and isolating (via centrifugation) soluble material (i.e., ungrafted) from insoluble material (i.e., grafted). Each portion is then dried and weighed. Based on the amount of solids, the percentage of soluble material (i.e., ungrafted) can be calculated by dividing the weight of the dry material by the weight of the initial solids before extraction.

As used herein, the term "molecular weight" or "weight average molecular weight" or "$M_w$" refers to the weight average molecular weight of a polymer as measured by gel permeation chromatography ("GPC"), for acrylic polymers against polystyrene calibration standards following ASTM D5296-11 (2011), and using tetrahydrofuran ("THF") as the mobile phase and diluent.

As used herein, the term "particle size" means the weight average particle size of the emulsion (co)polymer particles as measured using a Brookhaven BI-90 Particle Sizer.

The inventive PMMA resin compositions comprise a methyl methacrylate polymer and a multistage acrylic impact modifier. The methyl methacrylate polymer is present in the PMMA resin composition in an amount of from 30 to 90 weight %, preferably 40 to 80 weight %, and more preferably 50 to 70 weight %, based on the total weight of the PMMA resin composition. The methyl methacrylate polymer comprises polymerized structural units of methyl methacrylate monomers and, optionally, monomers that are copolymerizable with the methyl methacrylate monomers. The methyl methacrylate polymer can be prepared by emulsion polymerization, bulk polymerization, or solution polymerization. In certain embodiments, the methyl methacrylate polymer comprises polymerized structural units of methyl methacrylate monomer in an amount of from 50 to 100 weight %, preferably 90 to 99 weight %, and more preferably 95 to 98 weight %, based on the total weight of the methyl methacrylate polymer. Suitable copolymerizable monomers include, for example, aromatic vinyl compounds (e.g., styrene, α-methylstyrene, and chlorostyrene), acrylic esters (e.g., ethyl acrylate, butyl acrylate, n-octyl acrylate, and 2-ethylhexyl acrylate), and alkyl methacrylates other than methyl methacrylate. In certain embodiments, the methyl methacrylate polymer comprises polymerized structural units of copolymerizable monomer in an amount of from 0 to 50 weight %, preferably 1 to 10 weight %, and more preferably 2 to 5 weight %, based on the total weight of the methyl methacrylate polymer.

The multistage acrylic impact modifiers of the inventive PMMA resin compositions comprise a core-shell polymer and an overpolymer. The multistage acrylic impact modifier is present in the PMMA resin composition in an amount of from 10 to 70 weight %, preferably 20 to 60 weight %, and more preferably 30 to 50 weight %, based on the total weight of the PMMA resin composition. The core-shell polymer is present in the multistage acrylic impact modifier in an amount of from 50 to 99 weight %, preferably from 65 to 95 weight %, and more preferably from 70 to 90 weight %, based on the total weight of the multistage acrylic impact modifier. The overpolymer is present in the multistage acrylic impact modifier in an amount of from 1 to 50 weight %, preferably of from 5 to 35 weight %, and more preferably of from 10 to 30 weight %, based on the total weight of the multistage acrylic impact modifier.

The core-shell polymer of the multistage acrylic impact modifier comprises a core polymer and a shell polymer. The core polymer is present in the core-shell polymer in an amount of from 50 to 99.9 weight %, preferably from 80 to 99 weight %, and more preferably from 90 to 98 weight %, based on the total weight of the core-shell polymer. The shell polymer is present in the core-shell polymer in an amount of from 0.1 to 50 weight %, preferably from 1 to 20 weight %, and more preferably of from 2 to 10 weight %, based on the total weight of the core-shell polymer. In certain embodiments, the multistage acrylic impact modifier comprises one or more intermediate layer polymers between the core polymer and the shell polymer.

The core polymer of the core-shell polymer comprises one or more $C_1$-$C_{12}$ alkyl acrylate monomers and one or more cross-linkers. Suitable $C_1$-$C_{12}$ alkyl acrylate monomers include, for example, methyl acrylate, ethyl acrylate, butyl acrylate, octyl acrylate, 2-ethylhexyl acrylate, lauryl acrylate, lauryl methacrylate, phenyl acrylate, phenoxyethyl acrylate, hydroxyethyl acrylate, and acrylonitrile. In certain embodiments, the $C_1$-$C_{12}$ alkyl acrylate monomers of the core polymer comprise one or more of butyl acrylate and 2-ethylhexyl acrylate. In certain embodiments, the core polymer comprises polymerized structural units of $C_1$-$C_{12}$ alkyl acrylate monomers in an amount of from 98.2 to 99.8 weight %, preferably from 98.6 to 99.7 weight %, and more preferably from 99 to 99.6 weight %, based on the total weight of the core polymer. In certain embodiments, the core polymer comprises structural units of butyl acrylate in an amount of from 50 to 100 weight %, preferably 60 to 90 weight %, and more preferably 70 to 80 weight %, and structural units of 2-ethylhexyl acrylate in an amount of from 0 to 50 weight %, preferably 10 to 40 weight %, and more preferably 20 to 30 weight %, based on the total amount of $C_1$-$C_{12}$ alkyl acrylate monomers in the core polymer. Suitable cross-linkers include, for example, ethylene glycol diacrylate, butylene glycol diacrylate, butylene glycol dimethacrylate, di(ethylene glycol) diacrylate, tetra(ethylene glycol) diacrylate, ethylene glycol dimethacrylate, di(ethylene glycol) dimethacrylate, tri(ethylene glycol) dimethacrylate, allyl methacrylate, allyl acrylate, trimethylol propane triacrylate, trimethylol propane trimethacrylate, pentaerythritol acrylate, pentaerythritol methacrylate, N,N'-methylenebisacrylamide, and divinyl benzene. In certain embodiments, the cross-linker comprises allyl methacrylate. In certain embodiments, the core polymer comprises structural units of cross-linkers in an amount of from 0.2 to 1.8 weight %, preferably from 0.3 to 1.4 weight %, and more preferably from 0.4 to 1 weight %, based on the total weight of the core polymer.

The shell polymer of the core-shell polymer comprises methyl methacrylate monomers and, optionally, monomers that are copolymerizable with the methyl methacrylate monomers. In certain embodiments, the shell polymer comprises polymerized structural units of methyl methacrylate monomers in an amount of from 50 to 100 weight %, preferably from 75 to 100 weight %, and more preferably from 95 to 100 weight %, based on the total weight of the shell polymer. Suitable copolymerizable monomers include, for example, aromatic vinyl compounds (e.g., styrene, α-methylstyrene, and chlorostyrene), acrylic esters (e.g., ethyl acrylate, butyl acrylate, n-octyl acrylate, and 2-ethylhexyl acrylate), and alkyl methacrylates other than methyl methacrylate. In certain embodiments, the shell polymer comprises polymerized structural units of copolymerizable monomer in an amount of from 0 to 50 weight %, preferably 0 to 25 weight %, and more preferably 0 to 5 weight %, based on the total weight of the shell polymer.

In certain embodiments, the multistage acrylic impact modifier further comprises one or more intermediate layers between the core and shell, each of which independently contains polymerized structural units of the monomer compositions described above for the entirety of the core and shell polymers. The multistage acrylic impact modifier may contain, for example, one, two, three, four, or five intermediate layers. In certain embodiments, the one or more intermediate layers contains a compositional gradient between the sub-layers such that the $T_g$ transitions from a minimum to a maximum over the width of the entire first intermediate layer. In certain embodiments, the calculated $T_g$ transitions from a lower limit of −50° C., −40° C., −30° C., −25° C., −15° C., or 0° C., to an upper limit of 70° C., 55° C., 35° C., or 15° C. While not wishing to be bound by theory, it is believed that the compositional gradient is achieved by the proper selection of and manner and timing of addition of monomers during the emulsion polymerization process used to prepare the first intermediate layer. A multistage polymerization process may be used during which monomers are added in stages, rather than all at once, to the emulsion polymerization reactor (or reactor vessel), permitting an interpenetration of one layer into adjacent layers resulting in a $T_g$ gradient over the first intermediate layer.

The overpolymer of the multistage acrylic impact modifier comprises methyl methacrylate monomer, chain transfer agents, and, optionally, monomers that are copolymerizable with the methyl methacrylate monomer. In certain embodiments, the overpolymer comprises polymerized structural units of methyl methacrylate monomer in an amount of from 50 to 99.95 weight %, preferably from 74.9 to 98.5 weight %, and more preferably from 84.5 to 97.5 weight %, based on the total weight of the overpolymer. Suitable chain transfer agents include, for example, butyl 3-mercaptopropionate, n-dodecyl mercaptan, 1,8-dimercapto-3,6-dioxaoctane, t-nonyl mercaptan, n-octyl mercaptan, t-dodecyl mercaptan, isooctyl 3-mercaptopropionate, pentaphenylethane, 4-methylbenzenethiol, 4,4'-thio-bis-benzenethiol, mercaptoethanol, 3-mercaptopropionic acid, and glycerol mercaptan. In certain embodiments, the chain transfer agent comprises one or more of butyl 3-mercaptopropionate and dodecyl mercaptan. In certain embodiments, the overpolymer comprises structural units of chain transfer agents in an amount of from 0.05 to 2 weight %, more preferably from 0.1 to 1.8 weight %, and more preferably from 0.5 to 1.5 weight %, based on the total weight of the overpolymer. Suitable copolymerizable monomers include, for example, aromatic vinyl compounds (e.g., styrene, α-methylstyrene, and chlorostyrene), acrylic esters (e.g., ethyl acrylate, butyl acrylate, n-octyl acrylate, and 2-ethylhexyl acrylate), and alkyl methacrylates other than methyl methacrylate. In certain embodiments, the copolymerizable monomer comprises butyl acrylate. In certain embodiments, the shell polymer comprises polymerized structural units of copolymerizable monomer in an amount of from 0 to 49.95 weight %, preferably 0.5 to 25 weight %, and more preferably 1 to 15 weight %, based on the total weight of the shell polymer. In certain embodiments, the overpolymer has a weight average molecular weight ($M_w$) of from 1,000 to 300,000 g/mol, 5,000 to 100,000 g/mol, and more preferably from 10,000 to 50,000 g/mol.

In certain embodiments, the multistage acrylic impact modifiers have a particle size in the range of from 100 to 400 nm, preferably of from 120 to 300 nm, more preferably of from 140 to 250 nm, and even more preferably of from 150 to 220 nm, as measured by a Brookhaven BI-90 Particle Sizer.

Suitable polymerization techniques for preparing the polymers contained in the inventive polymer compositions include, for example, emulsion polymerization and solution polymerization, preferably emulsion polymerization, as disclosed in U.S. Pat. No. 6,710,161. Aqueous emulsion polymerization processes typically are conducted in an aqueous reaction mixture, which contains at least one monomer and various synthesis adjuvants, such as the free radical sources, buffers, and reductants in an aqueous reaction medium. In certain embodiments, a chain transfer agent, also known as a regulator, may be used to limit molecular weight. The aqueous reaction medium is the continuous fluid phase of the aqueous reaction mixture and contains more than 50 weight % water and optionally one or more water miscible solvents, based on the weight of the aqueous reaction medium. Suitable water miscible solvents include, for example, methanol, ethanol, propanol, acetone, ethylene glycol ethyl ethers, propylene glycol propyl ethers, and diacetone alcohol. In certain embodiments, the aqueous reaction medium contains more than 90 weight % water, preferably more than 95 weight % water, and more preferably more than 98 weight % water, based on the weight of the aqueous reaction medium.

In order to produce a typical three-stage polymer, where all the stages, that is, the core rubber, the first shell stage and the second shell stage are linked together, a crosslinker agent, that can also serve as a graftlinker, is added in sufficient amount to the rubber core, when this is first synthesized. The crosslinker and/or graftlinker contains at least two double bonds and it is expected that only a fraction of them will react with the polymerizing rubber chains, thus leaving unreacted reactive unsaturated bonds after the rubber stage polymerization has ended. If enough unsaturated bonds are present after the rubber synthesis has been finalized, the first shell stage monomers can be added and grafting occurs as they react with the available unsaturated sites in the rubber core. Alternatively, a crosslinking agent and a graftlinking agent can be separately and suitably added to the polymerizing rubber to obtain crosslinking and grafting. A second shell stage can be polymerized on top of the first shell stage. The second stage can be chemically bound to the first stage via residual free radicals in the first stage and/or adding a graftlinking monomer to the first stage, the latter in a sufficient amount to avoid crosslinking of the first stage, but allow the second shell stage to graft unto it.

In contrast, a core-shell structure with an overpolymer follows the same procedure for the rubber core and the first shell stage. However, no graftlinker is added to the first shell stage and, to the extent possible in practice, it is ascertained that no residual double bonds nor free radicals are present after the first shell stage polymerization has ended, thus avoiding any potential sites for chemical connection between the first and second shell stages. Furthermore, adding a chain transfer agent to the second shell stage monomer mix minimizes grafting by capturing the free radical at the end of the growing polymer chains and starting new chains, thus keeping the free radical at the end of those chains from inserting into any reactive sites of the rubber core-first shell mass, and controlling its molecular weight.

The compositions of the present invention are readily prepared by compounding methods that are known in the art of PMMA resin processing. For example, the methyl methacrylate polymer and multistage acrylic impact modifiers of the present invention can be blended and processed using extruders of various types, including single- or twin-screw, with suitable elements, as well as planetary extruders or continuous-compounding kneaders. The operation might be divided into a first compounding step where, for example, pellets are produced, followed by an additional step to form final parts, such as an injection-molding device, a secondary extruder that produces sheet or profile, and so on. Alternatively, the final part can be produced in a single operation, for example, by adapting a die to the end of the compounding extruder.

The inventive polymer compositions may also contain other optional ingredients that include, for example, thermal stabilizers, lubricants, plasticizers, antioxidants, UV absorbers and light stabilizers, dyes, pigments, flame retardant agents, and other additives to prevent, reduce, or mask discoloration or deterioration caused by heating, aging, or exposure to light or weathering. The amount of optional ingredients effective for achieving the desired property provided by such ingredients can be readily determined by one skilled in the art.

As noted above, the PMMA resin compositions of the present invention have end use applications including, for example, sheet, thermoformed sheet, injection molded articles, blow molded articles, films, profiles, tape, and the like. Accordingly, the present invention also provides an article of manufacture comprising a PMMA resin composition as described herein.

Some embodiments of the invention will now be described in detail in the following Examples.

EXAMPLES

Example 1

Preparation of Exemplary and Comparative Multistage Acrylic Impact Modifiers

Exemplary multistage acrylic impact modifiers in accordance with the present invention and comparative multistage acrylic contain a core polymer and a shell polymer, and in the case of the exemplary multistage acrylic impact modifiers an overpolymer, the amounts and components of which are recited in Table 1.

TABLE 1

Exemplary and Comparative Multistage Acrylic Impact Modifiers

| Sample | | Monomer (wt %) |
|---|---|---|
| P-E1 | Core (76.8%): | 74.5 BA/24.8 2-EHA/0.7 ALMA |
| | Shell (3.2%): | 100 MMA |
| | Overpolymer (20%): | 89.1 MMA/9.9 BA/1 BMP |
| P-E2 | Core (73.6%): | 74.5 BA/24.8 2-EHA/0.7 ALMA |
| | Shell (6.4%): | 100 MMA |
| | Overpolymer (20%): | 89.1 MMA/9.9 BA/1 BMP |
| P-E3 | Core (73.6%): | 74.5 BA/24.8 2-EHA/0.7 ALMA |
| | Shell (6.4%): | 100 MMA |
| | Overpolymer (20%): | 88.93 MMA/9.88 BA/1.19 nDDM |
| P-E4 | Core (78.2%): | 74.5 BA/24.8 2-EHA/0.7 ALMA |
| | Shell (6.8%): | 100 MMA |
| | Overpolymer (15%): | 88.67 MMA/9.85 BA/1.48 BMP |
| P-E5 | Core (73.6%): | 74.5 BA/24.8 2-EHA/0.7 ALMA |
| | Shell (6.4%): | 100 MMA |
| | Overpolymer (20%): | 89.55 MMA/9.95 BA/0.5 BMP |
| P-E6 | Core (69%): | 74.5 BA/24.8 2-EHA/0.7 ALMA |
| | Shell (6%): | 100 MMA |
| | Overpolymer (25%): | 88.67 MMA/9.85 BA/1.48 BMP |
| P-E7 | Core (76.8%): | 99.3 BA/0.7 ALMA |
| | Shell (3.2%): | 100 MMA |
| | Overpolymer (20%): | 89.1 MMA/9.9 BA/1 BMP |
| P-E8 | Core (73.6%): | 74.5 BA/24.8 2-EHA/0.7 ALMA |
| | Shell (6.4%): | 100 MMA |
| | Overpolymer (20%): | 89.1 MMA/9.9 BA/1 BMP |
| P-C1* | Core (92%): | 74.5 BA/24.8 2-EHA/0.7 ALMA |
| | Shell (8%): | 100 MMA |

BA = butyl acrylate
2-EHA = 2-ethylhexyl acrylate
MMA = methyl methacrylate
ALMA = allyl methacrylate
BMP = butyl 3-mercaptopropionate
nDDM = n-dodecyl mercaptan
*Comparative For exemplary multistage acrylic impact modifier P-E1, deionized (DI) water (1974.5 g), Sequestrene (0.04 g), and tetrasodium pyrophosphate (1.7 g) were charged to a 5 L 4-necked round bottom flask equipped with a mechanical stirrer, nitrogen gas sparge, thermometer, condenser, heating mantle and temperature controller. The reactor contents were heated to 54° C. under a Nitrogen sparge for 45 minutes. In a mixing vessel the core polymer monomer mix was prepared by mixing butyl acrylate, BA, (932.5 g), 2-ethyl hexyl acrylate, 2-EHA, (310.6 g) and allyl methacrylate, ALMA (8.71 g). The catalyst solution was prepared separately by mixing DI water (81.86 g), tert-butyl hyperoxide (2.44 g of a 70% aqueous solution). The activator solution of DI water (82.61 g) and sodium formaldehyde sulfoxylate (1.69 g) was prepared. The emulsion polymerization was carried out by first switching the nitrogen sparge to a nitrogen sweep after 45 minutes on sparging, then adding a polymeric seed or "preform" (150.0 g) to the reactor.

The core polymer monomer mix was split into 4 portions (10.9%, 10.9%, 39.1%, and 39.1%). Part 1 of the core monomer mix (10.9%, 136 g) was added as a shot to the reactor at 50° C. Then 11.08 g of the activator and catalyst solutions listed above were added to the reactor over 3 minutes. Polystep A-18 (11.05 g of a 25% solution) was added 60 minutes after activator/catalyst addition. Part 2 of the core monomer mix (10.9%, 136 g) was added as a shot to the reactor at 53.1° C. Then 2.75 g of the activator and catalyst solutions listed above were added to the reactor over 1 minute. Polystep A-18 (18.36 g of a 25% solution) was added 60 minutes after activator/catalyst addition. Part 3 of the core monomer mix (39.1%, 489.9 g) was added as a shot to the reactor at 50° C. Then 9.99 g of the activator and catalyst solutions listed above were added to the reactor over 1 minute. Polystep A-18 (18.36 g of a 25% solution) was added 60 minutes after activator/catalyst addition. Part 4 of the core monomer mix (39.1%, 489.9 g) was added as a shot to the reactor at 56° C. Then 9.99 g of the activator and catalyst solutions listed above were added to the reactor over 10 minutes. Polystep A-18 (11.05 g of a 25% solution) was added 60 minutes after Activator/catalyst addition.

After 20 minutes, the shell monomer mix of methyl methacrylate (111.34 g) was added as a shot to the reactor at 52° C. Then 11.43 g of the activator and catalyst solutions listed above were added to the reactor over 3 minutes.

The overpolymer monomer emulsion was prepared in an agitated container with the following raw materials in the following order: 88.2 g DI water, 14.11 g of Polystep A-18, 317.4 g of methyl methacrylate, 35.27 g of butyl acrylate and 3.53 g of butyl 3-mercaptopropionate (BMP). The overpolymer emulsion polymerization was carried out by feeding the monomer emulsion over 45 minutes (10.19 g/min) with simultaneous start of feeds of both the remaining activator solution (36.22 g, fed at 0.48 g/min) and the remaining catalyst solution (36.22 g, fed at 0.48 g/min) with feed times of 75 minutes. The starting temperature of the reactor was 56° C. During the feeds, the temperature was allowed to increase up to 65° C., at which point that temperature was maintained for the remainder of the feeds.

After the completion of the feeds, the reaction was held for 10 minutes. After the hold the reactor was cooled to room temperature then packed out.

Exemplary multistage acrylic impact modifier P-E2 through P-E8 were prepared substantially as described above, with the appropriate changes in monomer amounts as recited in Table 1. Comparative multistage acrylic impact modifier P-C1 was prepared substantially as described above, except for the omission of an overpolymer emulsion polymerization.

Example 3

Particle Size Characterization of Exemplary and Comparative Multistage Acrylic Impact Modifiers Exemplary multistage acrylic impact modifiers in accordance with the present invention and comparative multistage acrylic impact modifiers as prepared in Example 1 were evaluated for particle size, as shown in Table 2.

TABLE 2

Particle Size Characterization of Multistage Acrylic Impact Modifiers

| Sample | Particle Size (nm) |
| --- | --- |
| P-E1 | 177 |
| P-E2 | 223 |
| P-E3 | 183 |
| P-E4 | 180 |
| P-E5 | 181 |
| P-E6 | 179 |
| P-E7 | 176 |
| P-E8 | 186 |
| P-C1* | 164 |

*Comparative

The particle size distributions was determined by light scattering using a Malvern Mastersizer 2000 Analyzer equipped with a 2000 uP module. Approximately 0.5 g of polymer emulsion samples were pre-diluted into 5 mL of 0.2 weight % active Triton 405 in degassed, DI water (diluents). The pre-diluted sample was added drop-wise to the diluent filled 2000 uP module 10 while the module was pumped at 1100 rpm. Red light obscurations were targeted to be between 4 and 8%. Samples were analyzed using a Mie scattering module (particle real refractive index of 1.48 and absorption of zero: Diluent real refractive index of 1.330 with absorption of zero). A general purpose (spherical) analysis model with "normal sensitivity" was used to analyze the diffraction patterns and convert them into particle size distributions.

Example 3

Isolation of Exemplary and Comparative Multistage Acrylic Impact Modifiers

Exemplary and comparative multistage acrylic impact modifiers as prepared in Example 1 were isolated by spray drying or coagulation.

Spray-drying was carried out in a Niro Atomizer Mobile Minor Spray Dryer. The spray-drier was operated using a 180° C. inlet and 65° C. outlet temperature. Powder was collected at the bottom of the drier.

Alternatively, coagulation of the emulsion was performed by first diluting the latex to a 30 wt. % solids concentration and was then heated to 32° C. In a separate container 9000 grams of a 0.37 wt. % solution of calcium chloride was continuously stirred and heated to 32° C. While maintaining steady agitation, the dispersion was slowly poured into the vessel containing the electrolyte solution. After several minutes, 135 grams of a 5.26 wt. % solution of calcium chloride was added to the vessel to make a mixture. After a one minute delay, 405 gr of 10% solids of a high molecular weight PMMA dispersion was added to the mixture. The resulting coagulated slurry was heated to 60 C and held at this temperature for 5 minutes. The slurry was cooled and put through a centrifuge to dewater and wash the slurry. The slurry was then dried in a vacuum oven overnight at 60 C.

Example 4

Characterization of Exemplary and Comparative Multistage Acrylic Impact Modifiers for Degree of Crosslinking and Extractable Material Exemplary multistage acrylic impact modifier P-E1 and comparative multistage acrylic impact modifier P-C1 were evaluated by characterizing the swell ratios of the core polymer, shell polymer, and overpolymer to determine the differences of molecular architecture between the two samples. The swell ratio of each successive polymer part (i.e., core, core+shell, core+shell+overpolymer) whose value is proportional to the amount of extractable soluble materials were measured by an internal method, where a predetermined amount of emulsion, about 1 gram, with a known solids level, is allowed to swell in about 10 ml of a solvent, such as tetrahydrofuran (THF), in a vial that is shaken overnight. Afterwards, the dispersion is poured into a test tube and placed in an ultracentrifuge and shaken for two hours. The insoluble portion is driven to the bottom of the tube. The supernatant, that contains the soluble portion of the polymer construct, is poured out, dried in a vacuum oven under moderate heat and weighed up, until a constant weight is achieved. The insoluble portion, swollen with solvent, is first weighed up and then dried under the same conditions as the insoluble portion and weighed up again. The swell ratio is then calculated by dividing the weight of the insoluble portion before drying, by the weight of the same portion after drying. Based on the amount of solids, the percentage of soluble material is calculated by dividing the weight of the dry material by the weight of the solids in the emulsion.

The results of the swell ratio measurements for the core, core+shell, and core+shell+overpolymer of exemplary multistage acrylic impact modifier P-E1 are shown in Table 3.

TABLE 3

Swell Ratio Characterization of Exemplary Multistage Acrylic Impact Modifier

| Sample P-E1 | % Solubles | Swell Ratio | % Insolubles | % Accountability |
|---|---|---|---|---|
| Core | 2.81% | 6.8 | 95.40% | 98.21% |
| Core + Shell | 3.05% | 6.96 | 95.68% | 98.73% |
| Core + Shell + Overpolymer | 19.54% | 6.95 | 80.75% | 100.29% |

The results of the swell ratio measurements for the core and core+shell of comparative multistage acrylic impact modifier C-E1 are shown in Table 4.

TABLE 4

Swell Ratio Characterization of Comparative Multistage Acrylic Impact Modifier

| Sample P-C1 | % Solubles | Swell Ratio | % Insolubles | % Accountability |
|---|---|---|---|---|
| Core | 2.74% | 6.69 | 97.27% | 100.01% |
| Core + Shell | 2.86% | 6.77 | 96.20% | 99.06% |

The data in Table 4 demonstrates that the majority of the solubles in the comparative multistage acrylic impact modifier P-C1 come from the core polymer, which indicates that most of the shell polymer (rigid shell material) is grafted to the structure. Exemplary multistage acrylic impact modifier P-E1 in Table 3 shows that the shell polymer is grafted to the core polymer; however, when the complete multistage acrylic impact modifier (i.e., core+shell+overpolymer) containing the overpolymer is tested, the overpolymer produces a high amount of soluble material. Subtracting the contribution of solubles from the previous stages renders a total soluble material of about 17 weight %, which establishes that most of the overpolymer (about 85%, when considering that it is used at about 20 parts per 80 parts of the core//shell structure) is not grafted. Therefore, linear polymeric material is free to flow into the matrix when the additive is compounded into it.

Example 5

Preparation of Exemplary and Comparative PMMA Resin Compositions

Exemplary PMMA resin compositions in accordance with the present invention and comparative PMMA resin compositions were prepared by blending 60 weight % methyl methacrylate polymer (Plexiglas 6N available from Evonik Industries) with 40 weight % of the respective multistage acrylic impact modifier as prepared in Example 1 (i.e., P-E1 through P-E8 and P-C1). All blends were prepared using an American Leistritz Micro 27 Lab Extruder with a medium shear screw and an L/D of 28. A 190-190-200-200-200-200-200° C. temperature profile was used, with a screw speed of 140 rpm. Dry blends of pellets and powder were fed at 15 lb/hr into the extruder. The extruder strand was cooled through a water trough and pelletized.

Example 6

Impact Strength, Melt Flow Rate, and Gloss Characterization of Exemplary and Comparative PMMA Resin Compositions Exemplary PMMA resin compositions in accordance with the present invention and comparative PMMA resin compositions as prepared in Example 5 were evaluated for impact strength, melt flow rate, and gloss. Exemplary PMMA resin compositions were also compared against PMMA resin compositions prepared in accordance with the procedures of Example 5, except that the impact modifier is a commercially available comparative.

Impact strength was evaluated in accordance with ASTM standard D-256 for notched Izod testing of plastics. Izod bars were prepared using an Arburg All Rounder 270C injection molder. The pellets were dried overnight under vacuum at 60° C. prior to injection molding. The temperature profile for the injection molder was 210-235-250-260-260° C., while the mold was held at a temperature of 54.4° C.

Melt flow rate was evaluated in accordance with ASTM standard D-1238. The conditions used were 250° C. and 3.8 Kg.

Gloss was measured on extruded tape strips following ASTM standard D-523. Extruded pellets were dried as above and processed in a lab extruder, in order to produce tape having a thickness of about 0.76 mm. The extruder was a System 5, RS-5000 single-screw extruder with a die designed to output 5 cm-wide strips. Zone 1 was set to a temperature of 185° C. while zones 2 and 3, as well as the die, were set at 195° C. The screw was programmed to rotate at a rate of 40 RPM and the downstream puller, driven by a Baldor Industrial Motor, operated at a 90 Volts (DC) and 1.3 Amps, produced a rotation speed of 30 units. The rollers in the puller were further controlled by modulating the motor with a Variac set at 50% output. Strips made following these conditions had an average thickness of 28-30 mils. 60 degree specular gloss was measured on five different points along the strips and the results averaged to provide a mean and standard deviation.

The results of the impact strength, melt flow, and gloss characterizations are shown in Table 5.

TABLE 5

Impact Strength, Melt Flow, and Gloss Characterization
of Exemplary and Comparative PMMA Resin Compositions

| PMMA Resin Sample | Notched Izod Impact (J/m) | Melt Flow Rate (dg/min) | 60° Gloss (%) |
|---|---|---|---|
| P-E1 | 51 ± 2.7 | 15 ± 1.0 | 55 ± 0.4 |
| P-E2 | 55 ± 1.6 | 16 ± 0.4 | 62 ± 0.4 |
| P-E3 | 62 ± 3 | 9 ± 1 | 66 ± 0.8 |
| P-E4 | 58 ± 1 | 11 ± 0 | 56 ± 1.2 |
| P-E5 | 47 ± 2 | 11 ± 1 | 65 ± 1.0 |
| P-E6 | 57 ± 8 | 19 ± 1 | 67 ± 2.0 |
| P-E7 | 62 ± 3 | 16 ± 0 | 72 ± 1.0 |
| P-E8 | 56 ± 2 | 13 ± 0 | 69 ± 0.6 |
| P-C1* | 68 ± 6.9 | 5 ± 0.4 | 34 ± 1.0 |
| P-C2*+ | 60 ± 2 | 9 ± 0.4 | 58 ± 0.4 |
| P-C3*++ | 51 ± 2 | 22 ± 0.4 | 67 ± 0.4 |

*Comparative
+PMMA resin composition containing 40 wt % M-210 available from Kaneka
++PMMA resin composition containing 40 wt % IR-442 available from Mitsubishi Chemical Corp.

The results demonstrate that exemplary PMMA resin compositions prepared in accordance with the present invention containing multistage acrylic impact modifiers having an overpolymer provide substantial increases in melt flow and gloss as compared against PMMA resin not containing an overpolymer, while maintaining an acceptable level of impact strength.

What is claimed is:

1. A poly(methyl methacrylate) resin composition comprising:
   (a) 30 to 90 weight % of a methyl methacrylate polymer, based on the total weight of the poly(methyl methacrylate) resin composition, comprising polymerized structural units of
      (i) 50 to 100 weight % methyl methacrylate monomer, based on the total weight of the methyl methacrylate polymer, and
      (ii) 0 to 50 weight % of a copolymerizable monomer, based on the total weight of the methyl methacrylate polymer;
   (b) 10 to 70 weight % of a multistage acrylic impact modifier, based on the total weight of the poly(methyl methacrylate) resin, comprising
      (i) 50 to 99 weight % of a core-shell polymer, based on the total weight of the multistage acrylic impact modifier, comprising
         (A) 50 to 99.9 weight % of a core polymer, based on the total weight of the core-shell polymer, comprising polymerized structural units of (1) 98.2 to 99.8 weight % of $C_1$-$C_{12}$ alkyl acrylate monomers, and (2) 0.2 to 1.8 weight % of a cross-linker, based on the total weight of the core polymer, and
         (B) 0.1 to 50 weight % of a shell polymer, based on the total weight of the core-shell polymer, comprising polymerized structural units of (1) 50 to 100 weight % methyl methacrylate monomers, and (2) 0 to 50 weight % of a copolymerizable monomer, based on the total weight of the shell polymer, and
      (ii) 1 to 50 weight % of an overpolymer, based on the total weight of the multistage acrylic impact modifier, comprising polymerized structural units of
         (A) 50 to 99.95 weight % methyl methacrylate monomers, based on the total weight of the overpolymer,
         (B) 0.05 to 2 weight % of a chain transfer agent, based on the total weight of the overpolymer, and
         (C) 0 to 49.95 weight % of a copolymerizable monomer.

2. The resin composition of claim 1, wherein the $C_1$-$C_{12}$ alkyl acrylate monomers of the core polymer of the multistage acrylic impact modifier comprise at least one of methyl acrylate, ethyl acrylate, butyl acrylate, octyl acrylate, 2-ethylhexyl acrylate, lauryl acrylate, lauryl methacrylate, phenyl acrylate, phenoxy-ethyl acrylate, hydroxyethyl acrylate, and acrylonitrile.

3. The resin composition of claim 2, wherein the $C_1$-$C_{12}$ alkyl acrylate monomers of the core polymer of the multistage acrylic impact modifier are selected from the group consisting of butyl acrylate, 2-ethylhexyl acrylate, and combinations thereof.

4. The resin composition of claim 1, wherein the copolymerizable monomer of the overpolymer comprises butyl acrylate.

5. The resin composition of claim 1, wherein the chain transfer agents of the overpolymer of the multistage acrylic impact modifier comprise at least one of butyl 3-mercaptopropionate, n-dodecyl mercaptan, 1,8-dimercapto-3,6-dioxaoctane, t-nonyl mercaptan, n-octyl mercaptan, t-dodecyl mercaptan, isooctyl 3-mercaptopropionate, pentaphenylethane, 4-methylbenzenethiol, 4,4'-thio-bis-benzenethiol, mercaptoethanol, 3-mercaptopropionic acid, and glycerol mercaptan.

6. The resin composition of claim 2, wherein the chain transfer agent comprises at least one of butyl 3-mercaptopropionate and dodecyl mercaptan.

7. The resin composition of claim 1, wherein the overpolymer has a weight average molecular weight of from 1,000 to 300.00 g/mol.

8. The resin composition of claim 1, wherein the multistage acrylic impact modifier has a particle size of from 150 to 250 nm.

9. An article of manufacture comprising a poly(methyl methacrylate) resin composition comprising:
   (a) 30 to 90 weight % of a methyl methacrylate polymer, based on the total weight of the poly(methyl methacrylate) resin, comprising polymerized structural units of
      (i) 50 to 100 weight % methyl methacrylate monomers, based on the total weight of the methyl methacrylate polymer, and
      (ii) 0 to 50 weight % of a copolymerizable monomer, based on the total weight of the methyl methacrylate polymer;
   (b) 10 to 70 weight % of a multistage acrylic impact modifier, based on the total weight of the poly(methyl methacrylate) resin, comprising
      (i) 50 to 99 weight % of a core-shell polymer, based on the total weight of the multistage acrylic impact modifier, comprising
         (A) 50 to 99.9 weight % of a core polymer, based on the total weight of the core-shell polymer, comprising polymerized structural units of (1) 98.4 to 99.8 weight % of $C_1$-$C_{12}$ alkyl acrylate monomers, and (2) 0.2 to 1.8 weight % of a cross-linker, based on the total weight of the core polymer, and
         (B) 0.1 to 50 weight % of a shell polymer, based on the total weight of the core-shell polymer, comprising polymerized structural units of (1) 50 to 100 weight % methyl methacrylate monomers, and (2) 0 to 50 weight % of a copolymerizable monomer, based on the total weight of the shell polymer, and (ii) 1 to 50 weight % of an overpolymer, based on the total weight of the multistage acrylic impact modifier, comprising polymerized structural units of
  (A) 50 to 99.95 weight % methyl methacrylate monomer, based on the total weight of the overpolymer,
  (B) 0.05 to 2 weight % of a chain transfer agent, based on the total weight of the overpolymer, and
  (C) 0 to 49.95 weight % of a copolymerizable monomer.

10. A poly(methyl methacrylate) resin composition comprising:
  (a) 50 to 70 weight % of a methyl methacrylate polymer, based on the total weight of the poly(methyl methacrylate) resin, comprising polymerized structural units of
    (i) 90 to 99 weight % methyl methacrylate monomers, based on the total weight of the methyl methacrylate polymer, and
    (ii) 1 to 10 weight % of a copolymerizable monomer, based on the total weight of the methyl methacrylate polymer;
  (b) 30 to 50 weight % of a multistage acrylic impact modifier, based on the total weight of the poly(methyl methacrylate) resin, comprising
    (i) 65 to 95 weight % of a core-shell polymer, based on the total weight of the multistage acrylic impact modifier, comprising
      (A) 90 to 98 weight % of a core polymer, based on the total weight of the core-shell polymer, comprising polymerized structural units of (1) 99 to 99.6 weight % of $C_1$-$C_{12}$ alkyl acrylate monomers selected from the group consisting of butyl acrylate, 2-ethylhexyl acrylate, and combinations thereof, and (2) 0.4 to 1.0 weight % of allyl methacrylate, based on the total weight of the core polymer, and
      (B) 2 to 10 weight % of a shell polymer, based on the total weight of the core-shell polymer, comprising polymerized structural units of (1) 95 to 100 weight % methyl methacrylate monomers, and (2) 0 to 5 weight % of a copolymerizable monomer, based on the total weight of the shell polymer, and
    (ii) 5 to 35 weight % of an overpolymer, based on the total weight of the multistage acrylic impact modifier, comprising polymerized structural units of
      (A) 84.5 to 97.5 weight % methyl methacrylate monomers, based on the total weight of the overpolymer,
      (B) 0.5 to 1.5 weight % of a chain transfer agent selected from the group consisting of butyl 3-mercaptopropionate, dodecyl mercaptan, and combinations thereof, based on the total weight of the overpolymer, and
      (C) 1 to 15 weight % butyl acrylate monomers, based on the total weight of the overpolymer.

* * * * *